United States Patent [19]

Thomas

[11] Patent Number: 4,505,373
[45] Date of Patent: Mar. 19, 1985

[54] EGG TRANSFER SYSTEM

[75] Inventor: Leslie P. Thomas, Canton, Mich.

[73] Assignee: Diamond Automations, Inc., Framington, Mich.

[21] Appl. No.: 394,443

[22] Filed: Jul. 1, 1982

[51] Int. Cl.³ .................................. B65G 47/26
[52] U.S. Cl. ......................... 198/432; 209/513; 198/488; 198/504
[58] Field of Search ............ 198/488, 504, 505, 774, 198/432, 427, 479; 209/513

[56] References Cited

U.S. PATENT DOCUMENTS

| | | |
|---|---|---|
| 2,731,146 | 1/1956 | Page . |
| 2,815,112 | 12/1957 | Engleson et al. .............. 198/427 |
| 3,213,999 | 10/1965 | Williams . |
| 3,217,857 | 11/1965 | Ellis et al. . |
| 3,295,658 | 1/1967 | Rose et al. . |
| 3,426,894 | 2/1969 | Page . |
| 3,478,862 | 11/1969 | Niederer .................... 198/774 |
| 3,898,435 | 8/1975 | Pritchard et al. ............. 209/513 |
| 4,122,941 | 10/1978 | Giles et al. .................. 198/505 |
| 4,149,623 | 4/1979 | Nelson ....................... 198/479 |
| 4,195,736 | 4/1980 | Loeffler . |
| 4,405,023 | 9/1983 | Guardiola ................... 198/504 |

FOREIGN PATENT DOCUMENTS 2508894 9/1975 Fed. Rep. of Germany ...... 198/488

Primary Examiner—Joseph E. Valenza
Assistant Examiner—Kyle E. Shane
Attorney, Agent, or Firm—Kenyon & Kenyon

[57] ABSTRACT

An egg transfer system suitable for advancing eggs in an egg grader from a candling station to a weighing station at which the eggs are each deposited and individually weighed. The grade of each individual egg is recorded after which the eggs are advanced to a lifting apparatus adapted to rotatably lift and transfer the eggs to a conveying conveyor for delivery to predetermined packers disposed downstream thereof.

45 Claims, 18 Drawing Figures

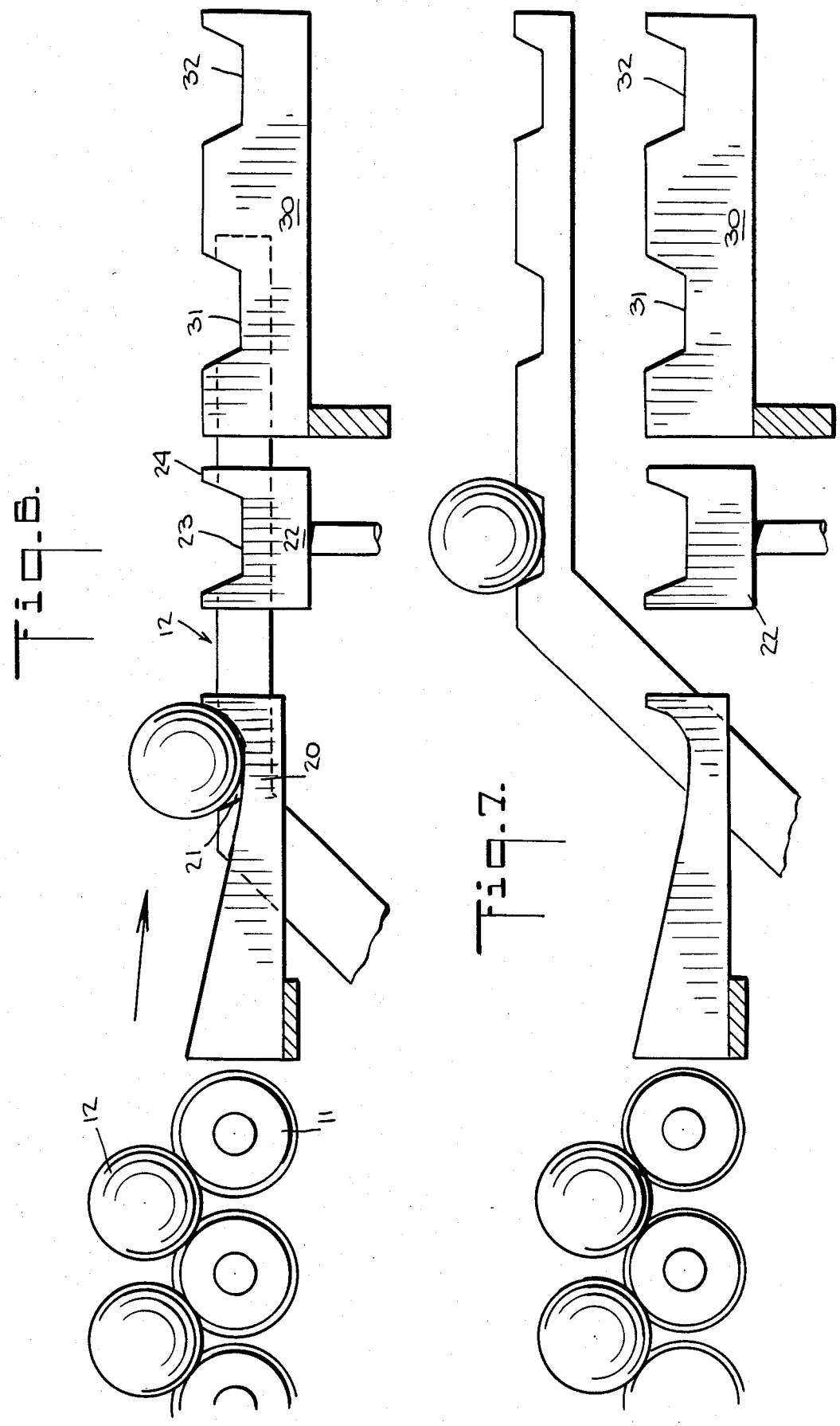

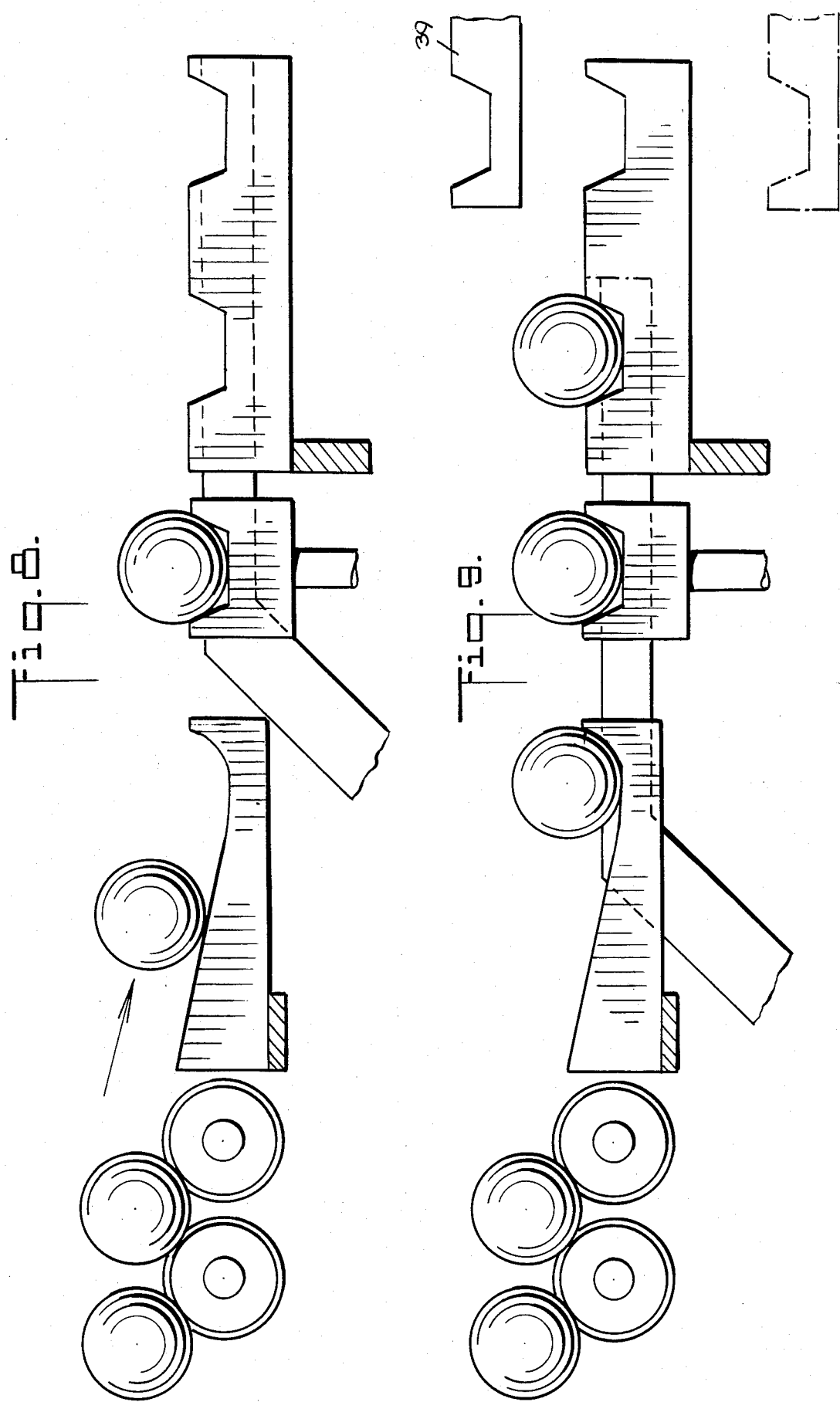

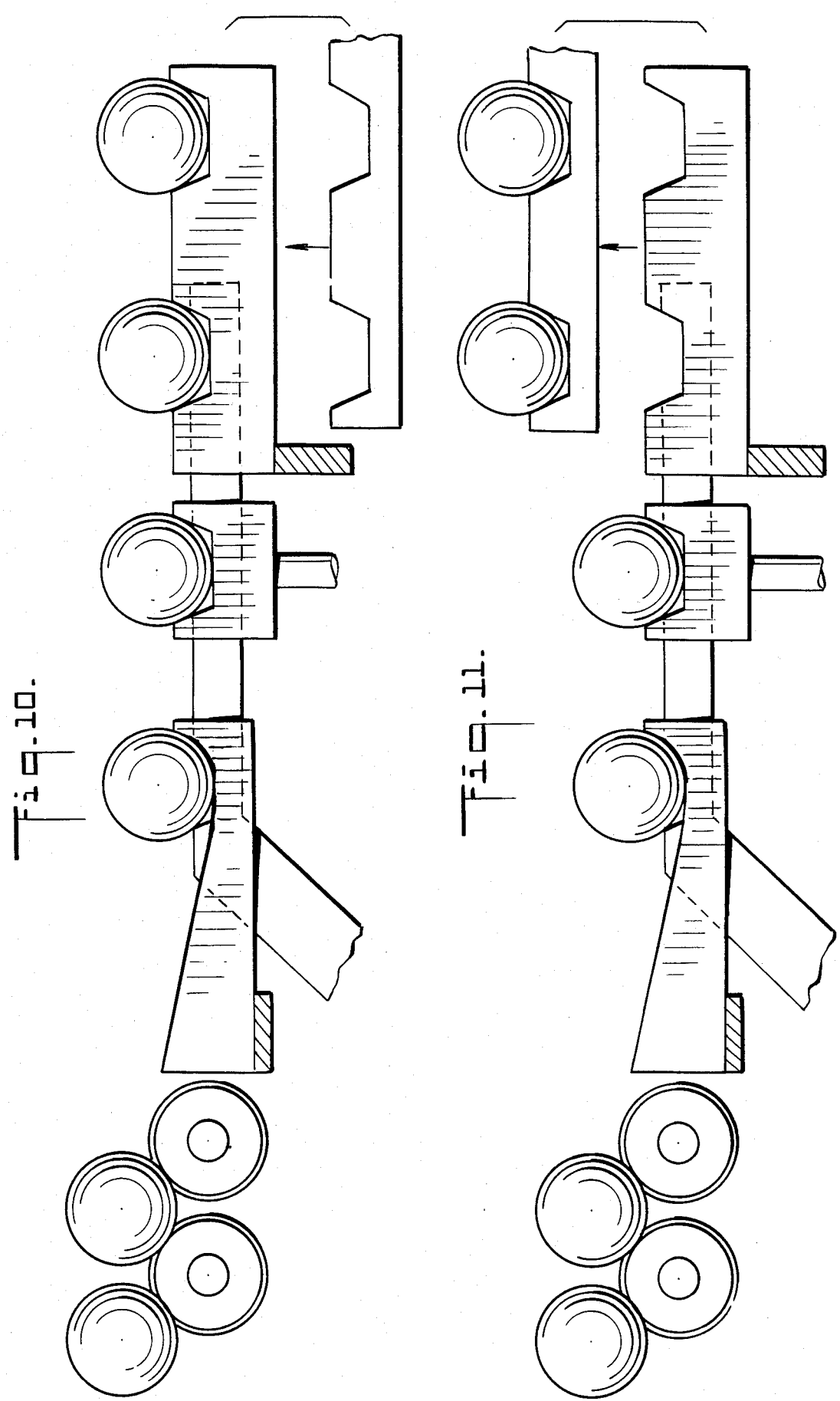

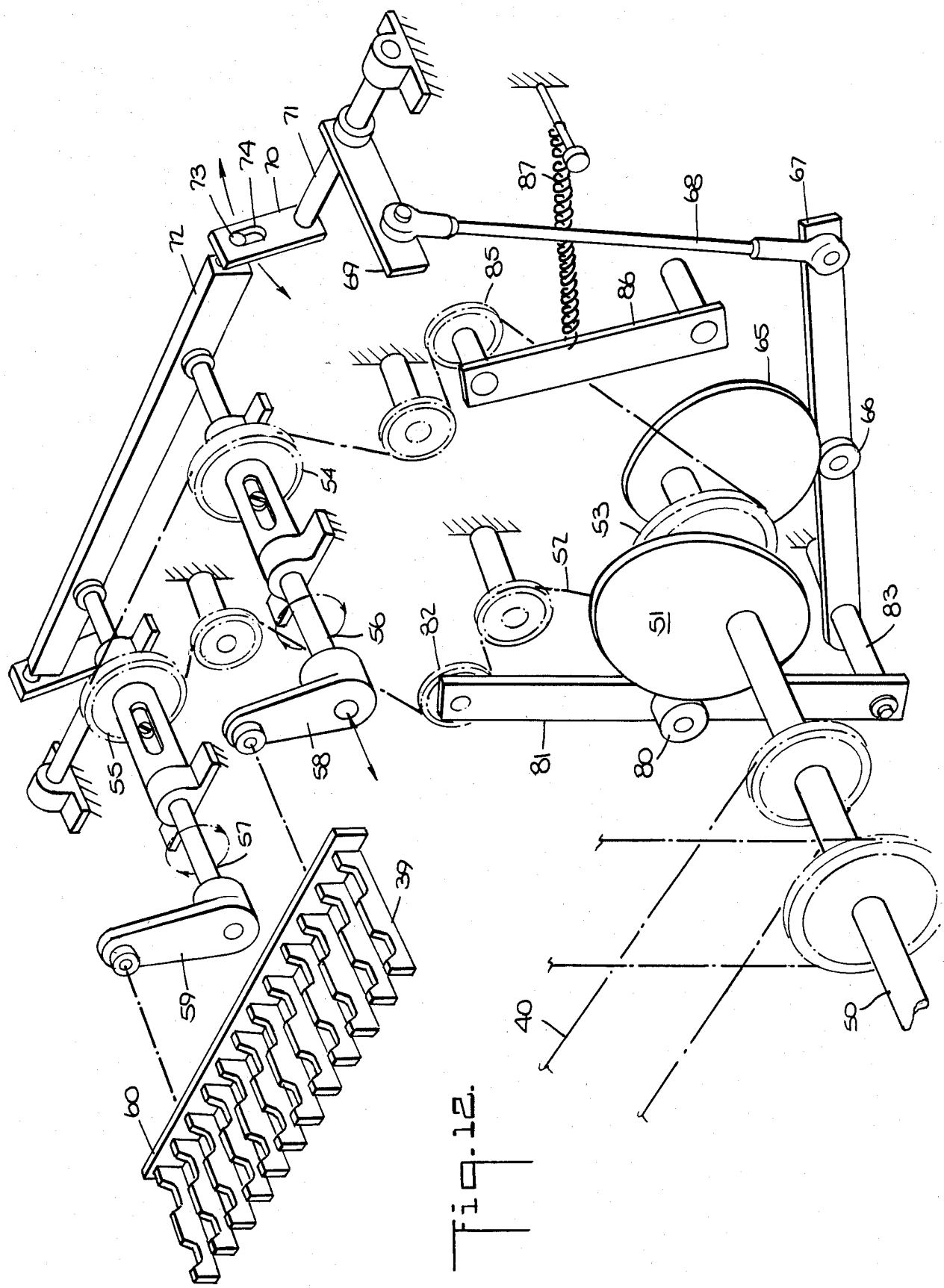

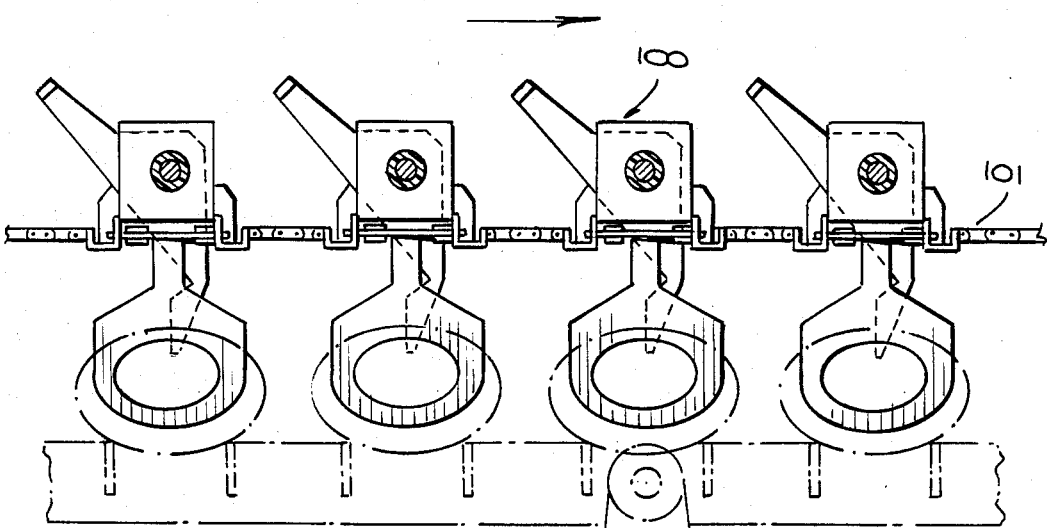
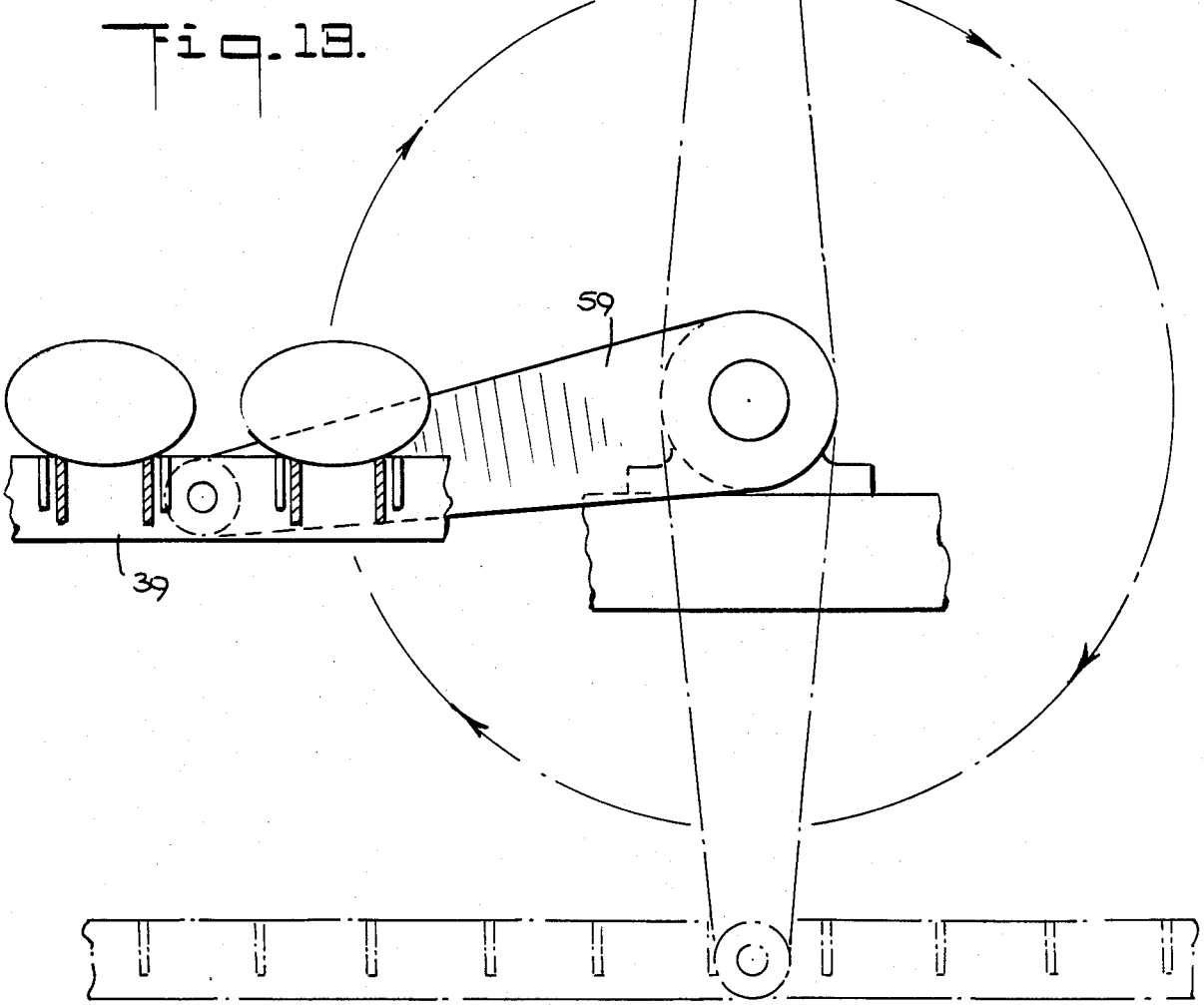
Fig.13.

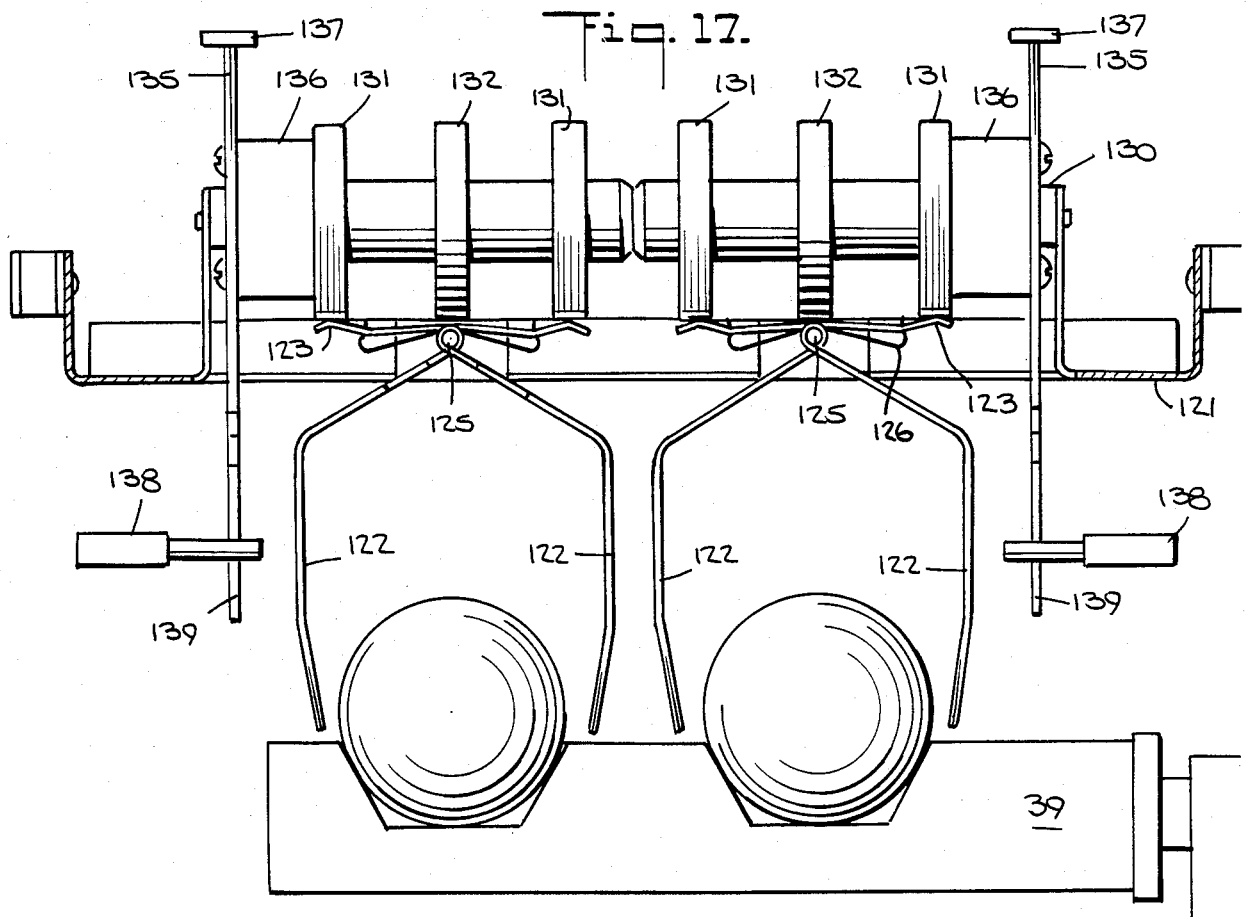
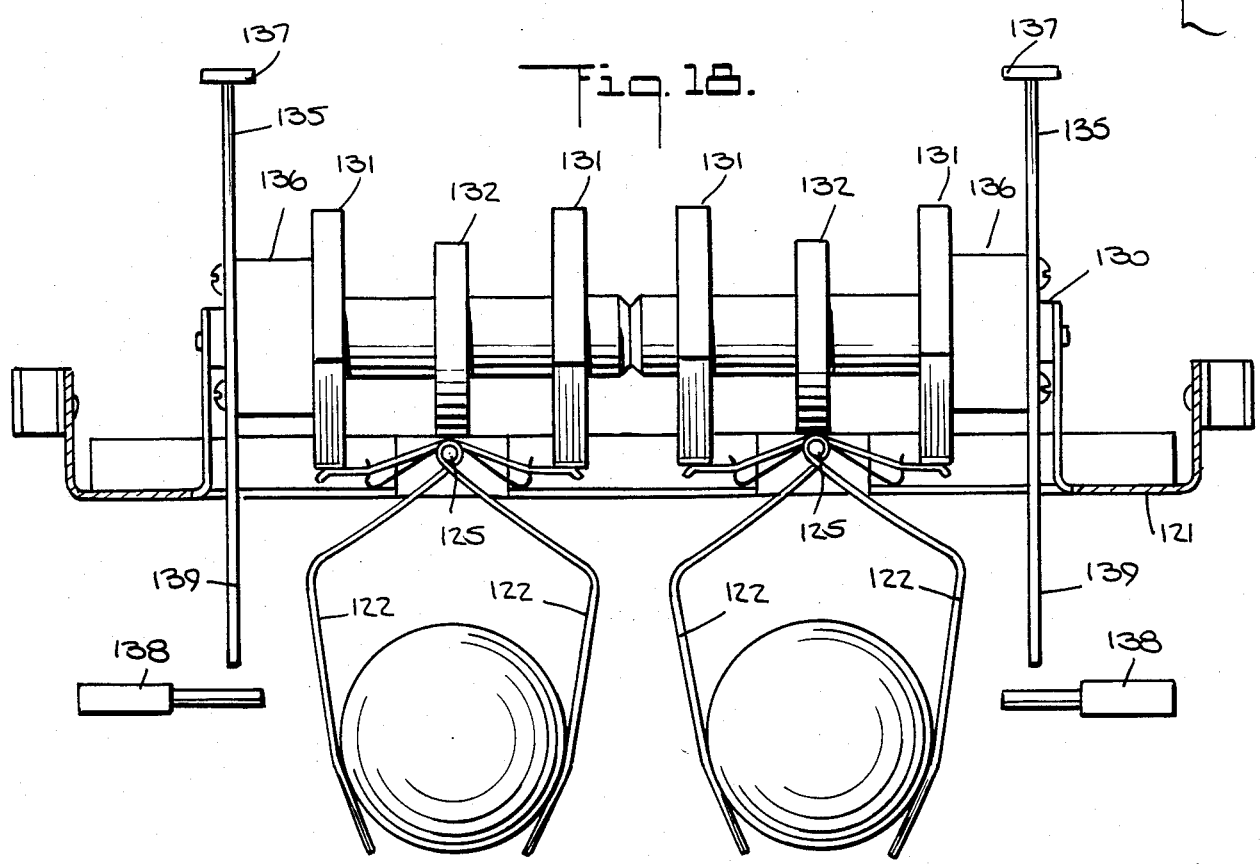

EGG TRANSFER SYSTEM

BACKGROUND OF THE INVENTION

This invention relates generally to an egg transfer system and in particular to one which is suitable for advancing eggs in a grader wherein individual eggs are classified in accordance with their characteristics including weight. More particularly, this invention relates to an apparatus and method by which the eggs are transferred from a candling station through a weighing station and on to conveying means for delivery to egg packers disposed downstream thereof.

In the processing of eggs, one important component of the processing system is an egg grader by which each of the eggs being processed is classified or graded in accordance with its particular characteristic including the weight or size of the egg. Generally, included in the egg grading process is a candling function by which defects such as blood spots, cracks or other defects are identified. In addition, as part of the grading process each egg is weighed in order to determine its size for ultimate packing with other eggs of a generally similar weight and size. In this respect the eggs are weighed in order to facilitate packing in accordance with established weight ranges specified by governmental agencies. Eggs are generally classified into designated classifications, dependent on weight, such as small, medium, large and extra large. In addition, classifications such as peewee and jumbo are utilized for those eggs not falling within the aforementioned weight classifications.

In an egg grader performing the above functions, limitations are placed on the operation of the machine which in turn dictates the maximum operating speed for an entire automated egg processing system. In order to improve the operating efficiency of such systems, increased demands of higher speed are made on the egg grader which in turn requires weighing systems having a high speed response time while maintaining accurate weighing of the respective eggs. In such egg grading systems, the weighing of the eggs is inherently limited to an individual measurement of each respective egg being processed. Accurate weighing is of the utmost importance in that inaccuracies would result in packaging eggs which are below grade and not conforming with government specifications for a respective size or too heavy which results in improper and uneconomical packaging. In that the weighing function must be conducted on each egg within a finite allotted time, inevitably this function places increased demands on the system employed to transfer the egg to the weighing station as well as the system employed to remove the egg from the weighing station. Similarly, increased demands in the form of higher operating speeds is placed on the system utilized for transferring or conveying the eggs for further processing.

In the copending application entitled "Egg Processing System", Ser. No. 394,162, filed July 1, 1982, an egg grader is disclosed which records the particular characteristics of each egg being processed through the system. In accordance with the measured characteristics of an egg as determined at the candling and weighing stations, each egg is deposited in a suitable packer along with eggs having similar characteristics which in turn allows for highly efficient automated handling of the eggs. In that the delivery of the eggs to packing machines is accomplished in conformance with the previously measured characteristics, processing of the egg must be on an individual basis with appropriate registration and identity maintained for each egg as it is being routed through the processing system. Thus, once the eggs are processed through the candling station as well as the weighing station, they must be individually routed while maintaining registration as to the position of the egg as it is processed through the system. When such registration is maintained, it is difficult to achieve a relatively high speed of operation as is required with an efficient automated processing system.

By the means disclosed herein, a transfer system is provided which effectively advances an egg from a candling station through a weighing station and onto a conveyor in which the identity and location of an individual egg is retained. In addition, the system as disclosed herein effective and capable of operating at a high rate of speed.

SUMMARY OF THE INVENTION

Briefly stated, the improved egg transfer system of this invention is provided with an egg weighing station disposed adjacent and downstream of an egg holding station which in turn is positioned adjacent and downstream of the candling station. A second holding station is positioned in line and downstream of the weighing station. A rotatably movable advancing means serves to advance the eggs from one station to another and is adapted to engage the egg from the underside thereof during the upward portion of its rotary movement. A lifting means is provided to engage the egg from the underside thereof and lift the egg upwardly and away from the second holding station. The lifting means is rotationally and reciprocally movable with respect to the second egg holding station with the rotational movement being about an axis generally parallel to the line formed between the holding stations and weighing station. In this manner the rotational movement of the lifting means serves to facilitate engagement and lifting of the egg during the upward rotational movement thereof. The reciprocal movement of the lifting means is generally along a line parallel to the line formed by the holding stations and weighing station, the movement thereof being sufficient to reciprocate the lifting means away from the second egg holding station as the advancing means is being moved thereto.

The lifting means of this invention includes an elongated lifting member having an egg receiving section therein which is adapted to engage and lift an egg from the underside at a holding station. Movement of the lifting means is provided by a rotary drive means which is coupled to a crank member which in turn is coupled to the lifting member for rotationally driving the lifting member with respect to the second holding station. The crank member is positioned with its drive axis offset with respect to the second holding station so that the lifting member is rotationally movable into engagement with an egg disposed at the second holding station. A reciprocating drive means is further coupled to the lifting member. In this manner, the lifting member is rotationally moved to engage an egg at the second holding station from the underside thereof and effect an upward lifting away from the station while the reciprocating drive means serves to reciprocally move the lifting member toward and away from the second holding station.

In another embodiment, the invention herein encompasses an egg transfer system for advancing an egg from a candling station and includes an inclined surface at the upstream end thereof to facilitate a gravity feed of the eggs from the candling station onto the elongated egg holding means. A weighing station is disposed adjacent the egg holding means and is adapted to weigh individually each egg positioned thereon and transmit the recorded information to a memory or storage means. A transfer means is further included in the form of a rotatably movable member adapted to engage an egg from the underside thereof and transfer the egg from the egg holding means to the weighing station. The transfer means includes a pair of egg engaging surfaces sufficiently spaced from one another a distance at least equal to the width of the narrow elongated holding means and weighing means in order to accommodate upward movement of the egg engaging surfaces thereover and allow the surfaces to engage the egg disposed thereon from the underside thereof. A drive means is coupled to the transfer means for driving the egg engaging surfaces with respect to the holding means and weighing station in a generally elliptical path so as to enable the egg engaging surfaces to advance an egg therefrom.

In a specific embodiment, the transfer means includes a generally horizontal section having at least two egg receiving sections in each of the spaced apart surfaces. A downwardly depending inclined section is connected to the upper horizontal section, the downwardly inclined section being coupled at its lower end to the rotary drive means. The rotary drive means includes a drive motor and being pivotally connected to the lower end of the downwardly inclined section. A second crank member, also rotatably driven by the drive motor, is coupled to a pivotably movable connecting linkage. The other end of the connecting linkage is pivotally coupled to the inclined section of the transfer means at a point above that of the first crank member so as to drive the upper horizontal section of the transfer means in a generally elliptical path with the movement between the holding means and weighing station being along the major axis of the elliptical path.

In a further embodiment of the invention, a plurality of carriage assemblies are provided to move adjacent the lifting means in the form of a conveying assembly adapted to deliver and deposit the graded eggs into suitably positioned packers. The carriage assembly is adapted to be conveyed in a generally linear direction through a line generally tangent to the path of the rotary driven lifting means. The carriage assembly includes a pair of oppositely disposed egg engaging members which are pivotally movable with respect to one another so as to engage and close upon an egg being transferred from the lifting means. Each egg engaging member is provided with a downwardly depending curved portion contoured to conform to the shape of the egg in order to facilitate a holding engagement therewith. Means are coupled to the egg engaging members suitable for pivotally closing the members upon one another as the carriage assembly passes the lifting member thereby transferring the egg thereto.

In a specific embodiment, the egg holding means disposed at the transfer position is provided in the form of a narrow elongated member including a pair of egg receiving sections therein. Complementary thereto, the carriage assembly is provided with two pairs of egg engaging members to facilitate simultaneous transfer of two eggs by the lifting means to the carriage assembly.

In the method of this invention, eggs are transferred through a weighing station at which individual eggs are graded in accordance with their respective size. The eggs are transferred away from a candling area to a weighing station at which the individual eggs are weighed. The eggs are then advanced from the weighing station to a holding station at which the eggs are lifted from the underside thereof and rotated upwardly with respect thereto. The lifted eggs are moved in a longitudinal direction away from the holding station during the rotational movement thereof in order to facilitate advancement of subsequent eggs from the weighing station to the holding station.

Specifically, the lifting of the eggs from the holding station into engagement with the carriage assembly lifting the eggs from the underside thereof and rotating the eggs upwardly with respect to the holding station. An egg engaging carriage assembly having the egg engaging members facing downwardly is routed in a path generally tangent to the path of the upwardly rotating eggs. The carriage assembly is preferably moving in a horizontal path at the point upon which it is placed into the egg engaging relation. The upwardly rotated eggs are engaged by the downwardly depending egg engaging members of the carriage assembly which are closed thereon. In the preferred embodiment, the lifting of the eggs from the holding station from the underside thereof and rotating the eggs upwardly with respect thereto further includes the steps of reciprocally moving the lifted eggs away from the holding station. These two latter steps are accomplished simultaneously. In order to effect appropriate classification of the graded eggs at the packaging station, the method further includes the step of storing information pertaining to the weight of each of the respective eggs weighed at the weighing station.

Accordingly, it is an object of this invention to provide an egg transfer system which is capable of moving an egg from one position to another while operating at a significantly high speed of operation.

It is another object of this invention to provide an egg transfer system adapted to move an egg through a weighing station at which the size of each egg being processed is measured.

It is still another object of this invention to provide an egg transfer system for advancing an egg at a candling station and depositing the egg at a weighing station.

It is still another object of this invention to provide an egg lifting system adapted to lift an egg upwardly and in a direction away from a holding station.

It is a still further object of this invention to provide an egg lifting system adapted to lift upwardly a previously graded egg and effect the transfer thereof onto a conveyor means.

It is a still further object of this invention to provide a method of transferring eggs through a weighing station at which each of the eggs are graded according to their respective size.

These and other objects, advantages and features of the invention will become more apparent from the following description taken in conjunction with the accompanying drawings.

BRIEF DESCRIPTION OF THE DRAWINGS

FIG. 6 is an enlarged elevation view, partially in cross-section, of the egg weighing station depicting an egg fed from the candling station onto a first holding station;

FIG. 7 is an enlarged elevation view, similar to that of FIG. 6, illustrating an egg being advanced onto the egg weighing station;

FIG. 8 is an enlarged elevation view, similar to that of FIG. 6, illustrating an egg being deposited on the weighing station and another egg being fed from the candling station to the first holding station;

FIG. 9 is an enlarged elevation view, similar to that of FIG. 6, illustrating an egg being advanced from the weighing station to a second holding station;

FIG. 10 is an enlarged elevation view, similar to that of FIG. 6, depicting eggs deposited at each of the holding and weighing stations with the lifting means disposed beneath the second holding station;

FIG. 11 is an enlarged elevation view similar to that of FIG. 10, illustrating the upward lifting of eggs from the second holding station;

FIG. 12 is a perspective view of the lifting means drive system of this invention;

FIG. 13 is an elevation view, looking from the rear of the machine, of the egg lifting means and conveyor carriage assemblies of this invention with the carriage in the open position about to engage the eggs;

FIG. 17 is a front elevation view of the egg carriage assembly with the egg-engaging members in the open position; and FIG. 18 is a front elevation view of the egg carriage assembly with the egg-engaging members in the closed position.

DESCRIPTION OF THE PREFERRED EMBODIMENT

Figure 1:
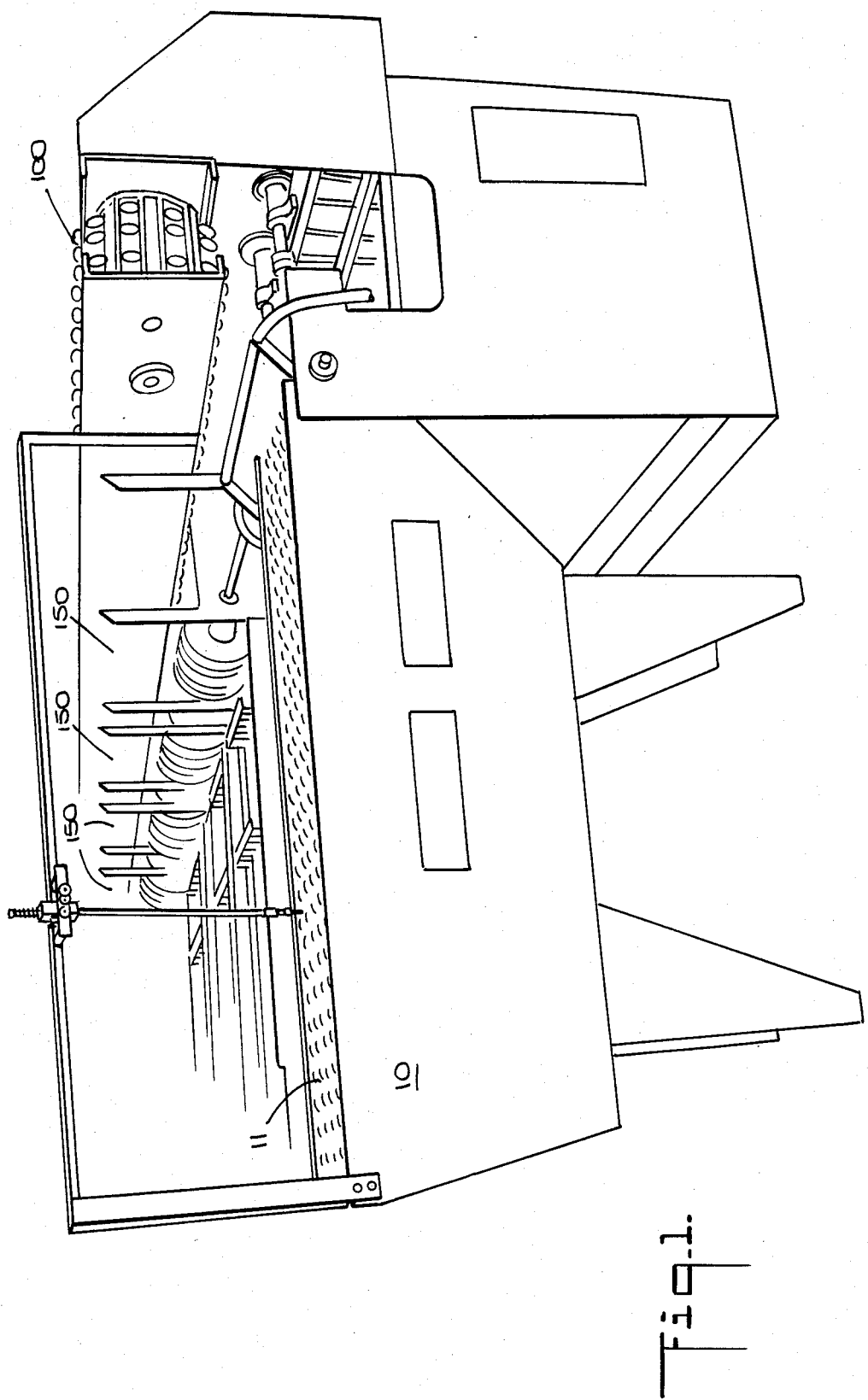
FIG. 1 is a perspective view of an egg grader employing the egg transfer systems of this system.
Figure 2:
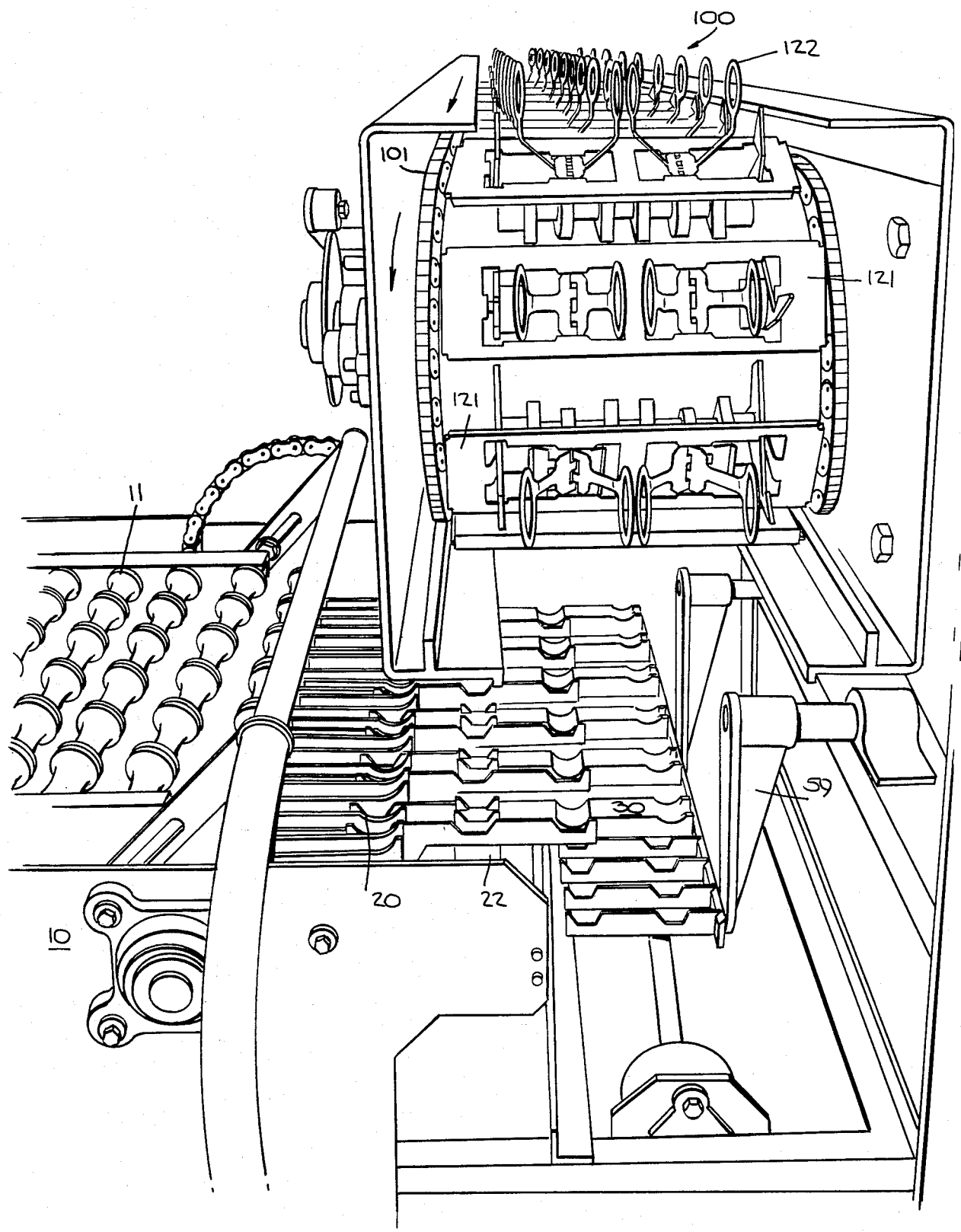
FIG. 2 is a perspective view of the egg transfer systems of this invention.

With particular reference to FIGS. 1 and 2, the egg transfer system of this invention is described in association with an egg grader, portions of which are disclosed in copending applications entitled "Egg Processing System" and "Egg Handling System", Ser. Nos. 394,162 and 394,161, filed on July 1, 1982 and July 1, 1982 respectively, the disclosure of which are herein incorporated by reference. In the grader, eggs are first routed through an egg candling station 10 at which any defective eggs, e.g. those having cracks, blood spots or the like are identified. This system is more specifically described in the copending application Ser. No. 394,444, entitled "Article Coding and Separating System" filed July 1, 1982. At the candling station 10, an operator visually inspects the eggs which are passed over a high intensity light. As more fully described in application Ser. No. 394,444, each defective egg is identified by the operator with the information being processed and stored in the memory system.

Figures 3, 4:
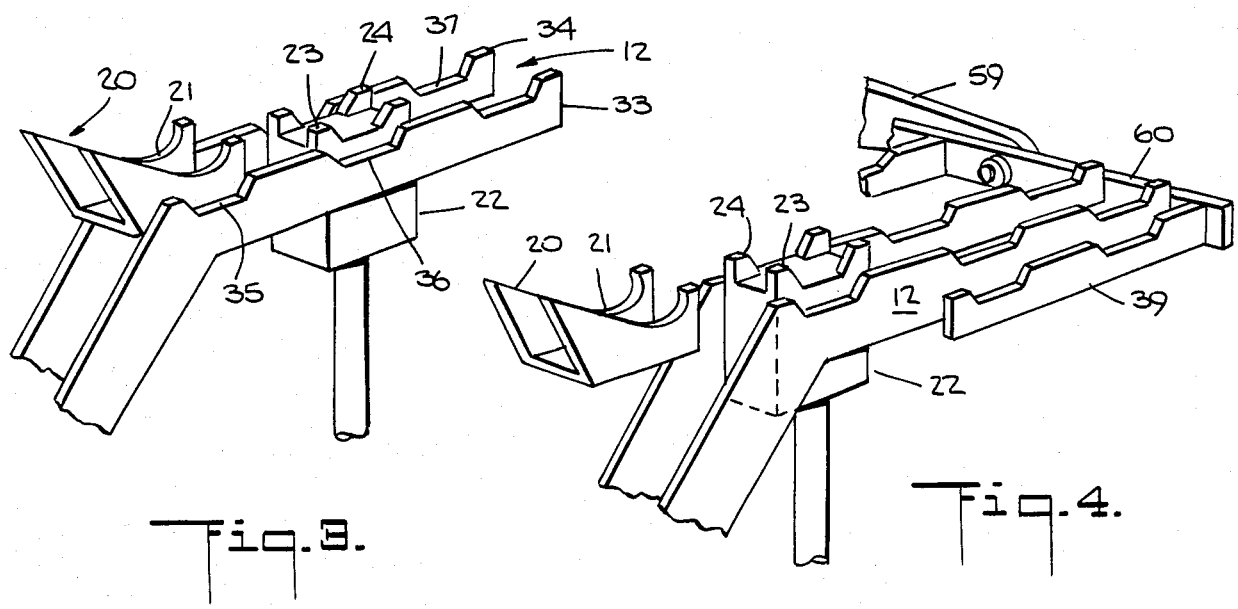
FIG. 3 is an enlarged perspective view of the weighing station.
FIG. 4 is an enlarged perspective view, similar to that of FIG. 3, further illustrating the egg lifting means of this invention.

The inspected eggs are conveyed through the candling station 10 by rotating spools 11 and fed onto a first holding station or bar 20 (FIG. 3). Holding bar 20 is in the form of a U-shaped channel having a recessed section 21 at which the egg, after passing through candling station 10 is positioned. The egg is fed off candling station 10 by the rotating spools and is gravity fed along the inclined surface of holding bar 20 into the recessed egg receiving section 21. A series of six holding bars 20 are disposed adjacent one another, such that six eggs may be fed simultaneously from candling station 10 through weighing station 22. After weighing, delivery is accomplished to a conveying means by the simultaneous transfer of twelve eggs as is described herein below. Of course, other multiples of bars may be provided in accordance with the invention.

Located downstream of holding bar 20 is the weighing station 22. Each weighing station 22 is provided in the form of a contoured upper section having a recess 23 adapted to hold an egg and is formed between the upwardly protruding prongs 24. Weighing station 22 includes a scale member which is movable in a vertical direction and serves to determine accurately the weight of each egg as it is positioned thereon. The weight of each egg as determined at weighing station 22 is then stored in a memory system as is more fully described in application Ser. No. 394,444. Downstream of weighing station 22 is a pick up station 30 which has provision for holding two eggs in the respective recesses 31 and 32.

Figure 5:
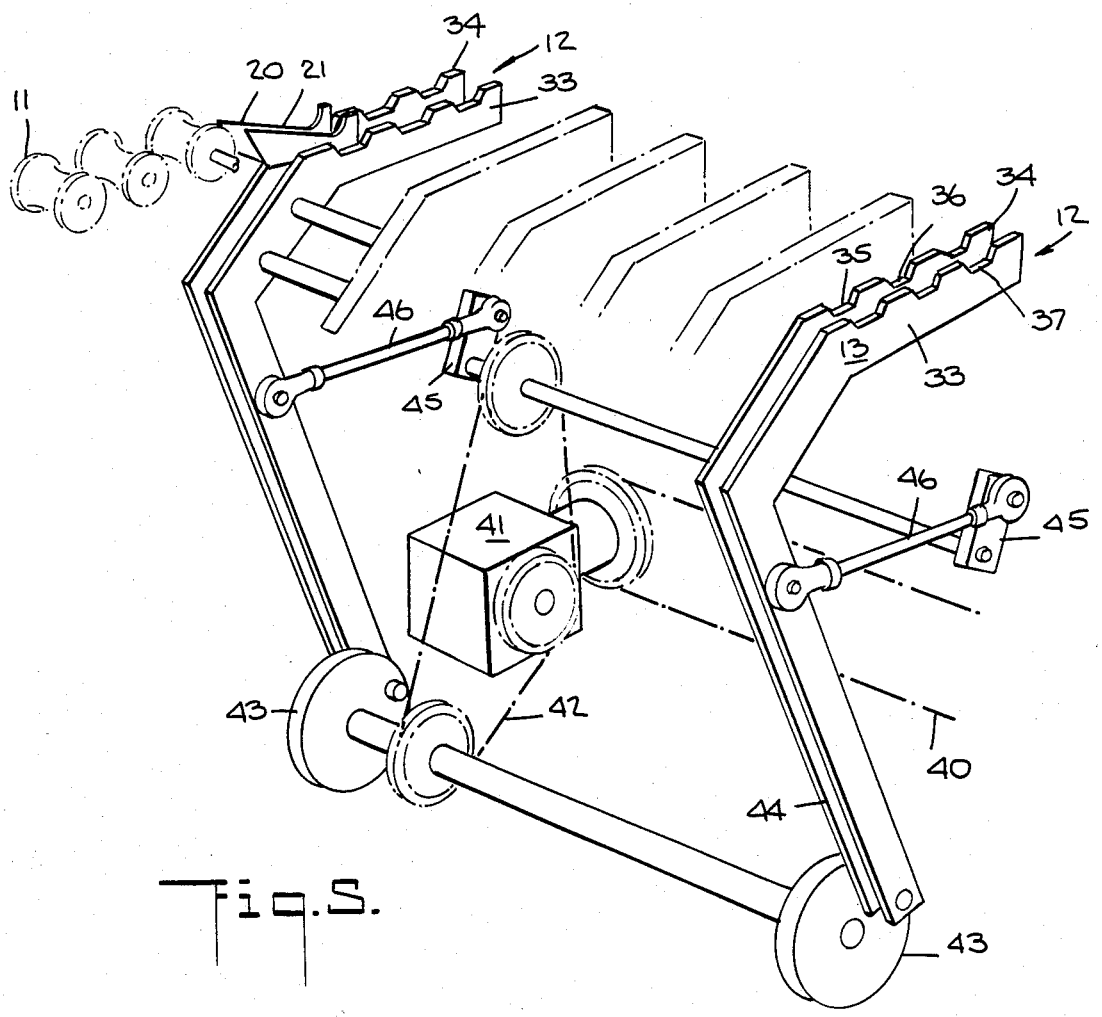
FIG. 5 is a perspective view of the egg advancing means drive system of this invention.
Figure 14:
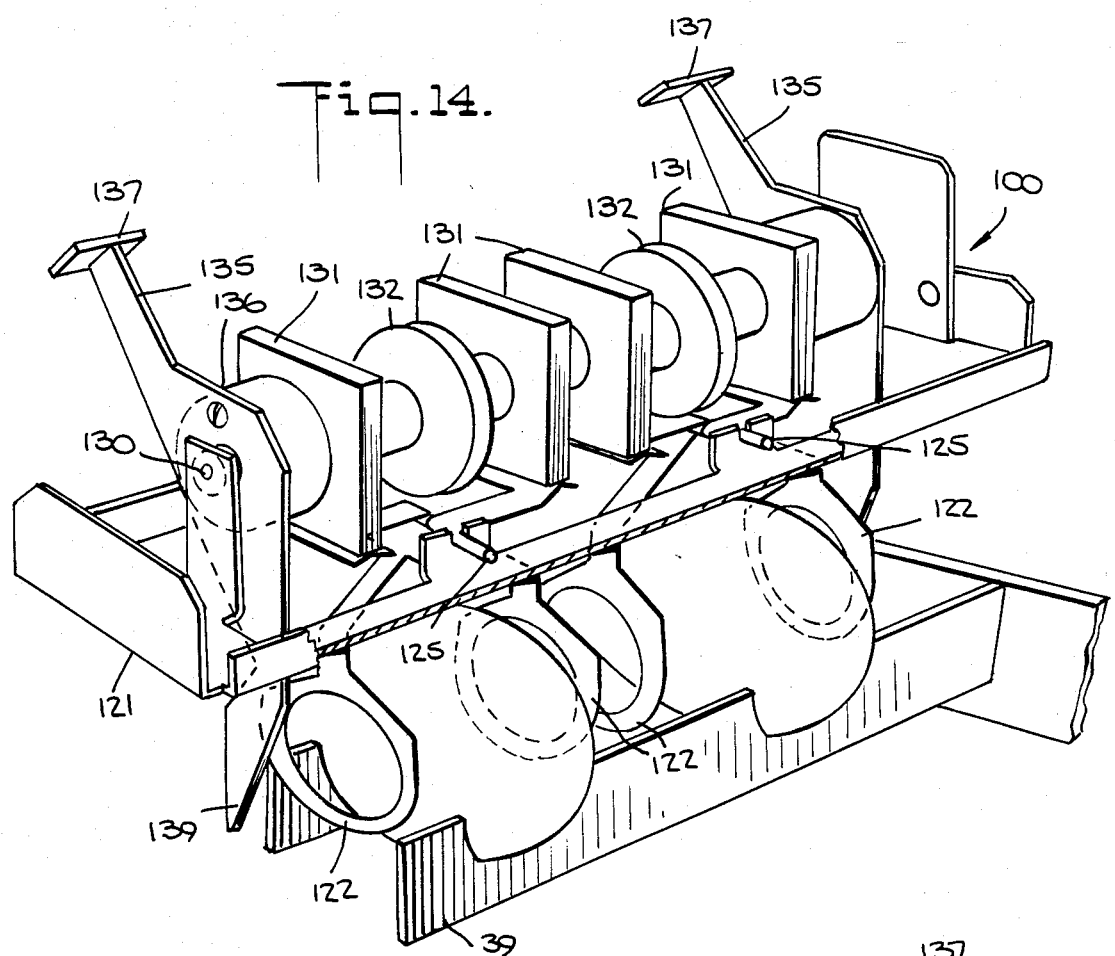
FIG. 14 is a perspective view of the egg carriage assembly of this invention with the holding members in the egg engaging position.

The eggs are advanced from candling station 10 to the pick-up station 30 by means of the drive system particularly illustrated in FIG. 5. The egg advancing means 12 includes an upper horizontal section 13 formed by spaced apart side members 33 and 34 each of which has three recesses 35, 36 and 37 for holding individual eggs. A main drive motor drives shaft 50 (FIG. 12) which in turn is connected to the right angle gear box 41 by drive chain 40, the output gear box 41 driving chain member 42. A pair of oppositely disposed crank members 43 are rotationally driven by chain 42 and pivotally connected to the downwardly depending arm 44 of the egg advancing means 12. Another pair of oppositely disposed crank members 45 are similarly driven by chain 42 and pivotally connected by way of linkage 46 to the downwardly depending arm 44 of the egg advancing means 12. In this manner, the upper horizontal section 13 is driven in an elliptical or oval path such that the portion of the path between the holding station 20, weighing station 22 and pick-up station 30 is along the major axis of the elliptical path.

With particular reference to FIGS. 3 through 11, the advancement of an egg from holding station 20 to pick-up station 30 is described. Eggs are rotatably moved through candling station 10 by means of the spools 11. As the egg is rolled from the candling station 10 by the last spool 11, it is rolled down the inclined portion into the recessed egg receiving section 21 at holding station 20. Advancing means 12, and in particular recess 35 therein, engages the egg from the underside thereof and lifts the egg upwardly into the position depicted in FIG. 7. As advancing means 12 is lowered along its elliptical path, the egg is moved from the recess 21 onto the scale at weighing station 22 as illustrated in FIG. 8. A second egg is then rolled down the inclined portion of bar 20 into recessed section 21 of holding station 20.

By a similar movement of the advancing means 12 along its elliptical path, the egg is lifted from the weighing station 22 and advanced to recess 31 at pick-up station 30 (FIG. 9). Subsequently, the egg is advanced again by advancing means 12 into recess 32 of pick-up station 30 (FIG. 10).

Once two eggs are in position at pick-up station 30, each of the eggs in recesses 31 and 32 is lifted upwardly by lifting plates 39 which moves both rotationally with respect to pick-up station 30 as well as in a direction longitudinally with respect thereto. The longitudinal movement of lifting plate 39 with respect to pick-up station 30 serves to move the lifted eggs away from pick-up station 30 as the advancing means 12 is moving a subsequent egg into the recesses 31 and 32.

With reference particularly to FIG. 12, the drive system for lifting arm 39 is illustrated. A main drive motor is coupled to drive shaft 50 which has mounted thereon a differential speed cam 51 and sprocket driven chains 40 and 52. Chain 40 as previously described provides the drive for advancing means 12 (FIG. 5). Chain 52 which is driven by sprocket 53 in turn serves to drive a pair of differential speed drive sprockets 54 and 55. Each of the sprockets 54 and 55 drives the respective shafts 56 and 57 in a counterclockwise direction, the shafts having mounted on the end thereof a crank arm 58 and 59 respectively. Each rotary crank arm 58 and 59 is fastened to an elongated support bar 60 to which is mounted twelve (12) individual lifting plates 39, each adjacently spaced pair of lifting plates serving to lift an egg. Support bar 60 thus facilitates the simultaneous lifting of two rows of six side-by-side eggs. In other words, adjacently spaced lifting plates 39 serve to lift simultaneously twelve (12) eggs from the six pick-up stations 30 provided in the egg grader.

Cam 65 is mounted at the end of main drive shaft 50 and is engaged with cam follower 66 mounted on the pivotable arm 67 which in turn is connected at the end thereof to connecting linkage 68. Linkage 68 is pivotally connected to the right angle drive arm 69 which in turn drives coupling bar 70 with an oscillating motion about shaft 71. Drive bar 72 is reciprocally driven in a direction toward and away from pick-up station 30 by means of coupling bar 70 is connected thereto via pin 73 slidably mounted in slot 74.

Cam 51 is in rotational engagement with cam follower 80 mounted to arm 81 which has mounted at its upper end an idler 82 and at its lower end is pivotally connected by shaft 83 to pivotable arm 67. Chain 52 is further routed over idler sprocket 85 which in turn is mounted to an idler arm 86 fastened to spring 87. In this manner, the spring loaded idler arm 86 serves to maintain tension in the drive chain 52 while support bar 60 is driven both rotationally and longitudinally with respect to pick-up station 30. Further, differential speed cam 51 serves to regulate rotational drive speed of lifting plates 39 such that when the plates 39 arrive at the pick-up station 30 (when the eggs are being removed therefrom), the rotational speed of the lifting plate 39 is decreased to facilitate the smooth upward lifting of the egg from the pick-up station.

In this latter connection, reference is made to FIG. 13 in which the rotational movement of crank arm 59 and lifting plate 39 is illustrated. As illustrated, lifting plate 39 engages the egg from the underside thereof at pick-up station 30 which is positioned in the rotational path at approximately the nine o'clock position. Plate 39 is then rotated clockwise while also being moved longitudinally away from pick-up station 30. At the twelve o'clock position each of the eggs is brought within the depending arms of a carriage assembly 100 which is part of a conveyor driven by a chain 101. At this position, both the eggs and carriage assembly are travelling at the same speed to properly effect transfer.

The carriage assemblies 100 are more fully disclosed in the copending application Ser. No. 394,430, entitled "Egg Carrier" and filed on July 1, 1982. Briefly, carriage assembly 100 includes a sheet metal platform 121 which has mounted thereon a pair of depending prongs or egg engaging members 122. Prongs 122 are pivotally mounted and positioned opposite one another in order to engage an egg therebetween across its smaller side or width. The lower portion of prong 122 is curved so as to approximate the curvature across the smaller width of the egg. The upper portion of prong 122 is reversely bent so as to provide a surface having a generally horizontal orientation (FIGS. 17 and 18). The bent portion of prong 122 is mounted on a fixed shaft 125 so as to be pivotally movable with respect thereto. The opposing prong 122 is similarly mounted over shaft 125 with the free end thereof in engagement with the generally horizontal portion of prong 122.

A mounting shaft 130 is positioned on the platform 121 generally perpencidular with respect to the fixed shafts 125. Cam members 131 have a generally square profile and are pivotally mounted on shaft 130 with the operative bottom flat surface being in engagement with the horizontal surface of egg engaging prong 22. An integral spacer 132 is between adjacent cam members 131 in order to maintain the proper spacing and engagement of the horizontal cam engaging surface with the horizontal surface of the egg engaging prong 122.

Coupled to each end of Cam members 131 is an extension bar 135 which is spaced from the end cam member 131 by integral spacer 136. Bar 135 is provided with an upper T-shaped portion 137 which is engagable with a solenoid actuated plunger 138 in order to actuate the rotational movement thereof. Each bar 135 is fastened or directly coupled to the adjacent spacer 136, cam 131, intermediate spacer 132 and the adjacent cam 131. In this manner, each pair of egg engaging prongs 122 is operated independent of one another although mounted to a common shaft 130.

In operation, the eggs are rotated by the spools 11 of candling station 10 and fed to recess 21 disposed in the first holding station 20. Advancing means 12 lifts the egg from the underside away from holding station 20 toward a weighing station 22 at which the weight of each individual egg is recorded. Once the weighing of each individual egg has been completed, advancing means 12 again engages the egg from the underside thereof and advances the egg to a pick-up station 30 at which two eggs are positioned prior to removal by lifting arm 39.

Figure 15:
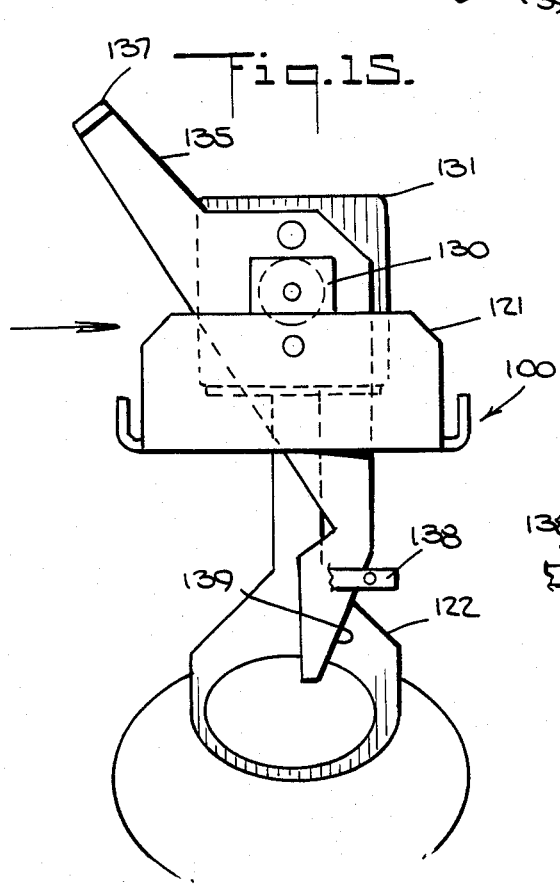
FIG. 15 is a side elevation view, looking from the rear of the machine, of the egg carriage assembly in the open or egg releasing position.

Lifting plates 39 rotate about an axis offset from the line formed between the holding station 20, weighing station 22 and pick-up station 30 so that the pair of eggs disposed at pick-up station 30 is engaged from the underside thereof when the lifting plates 39 reach approximately a nine o'clock position (looking from the rear of the machine). As plates 39 are moved upwardly from pick-up station 30, reciprocating drive bar 72 moves the lifting plate assembly away from station 30 so as to avoid any collision between the eggs being removed from the pickup station and the subsequent egg being advanced thereto. Once the eggs are in a position coincident with the approximate center of prongs 122 (approximately the twelve o'clock position), a prong of a comb assembly 138 is positioned in the path of the lower surface 139 of extension bar 135. In this manner, each carriage assembly 100 arrives at comb assembly 138 with bar 135 in the position depicted in FIG. 15. In operation and as explained in greater detail in application Ser. No. 394,162, a comb assembly 138 closes or latches prongs 122 on twelve eggs simultaneously. When a prong of comb assembly 138 engages lower surface 139 of extension bar 135, the bar is caused to rotate in a clockwise direction (looking from the rear of the machine) while rotating cam members 131 therewith. Cams 131 are rotated approximately 45° such that the angular or corner portion thereof downwardly moves the horizontal surface 123 of the egg engaging prongs 122. The downward movement of the generally horizontal cam engaging surface 123 causes the lower egg engaging portion of prongs 122 to move inward with respect to one another and close into an engaging relationship with the egg. In this manner, the egg is thus lifted from lifting plates 39 and conveyed to a packaging position downstream in the grader machine. When bar 35 is pivotally moved into the closed position, the lower portion thereof engages platform 21 which in turn limits the rotational movement thereof.

Figure 16:
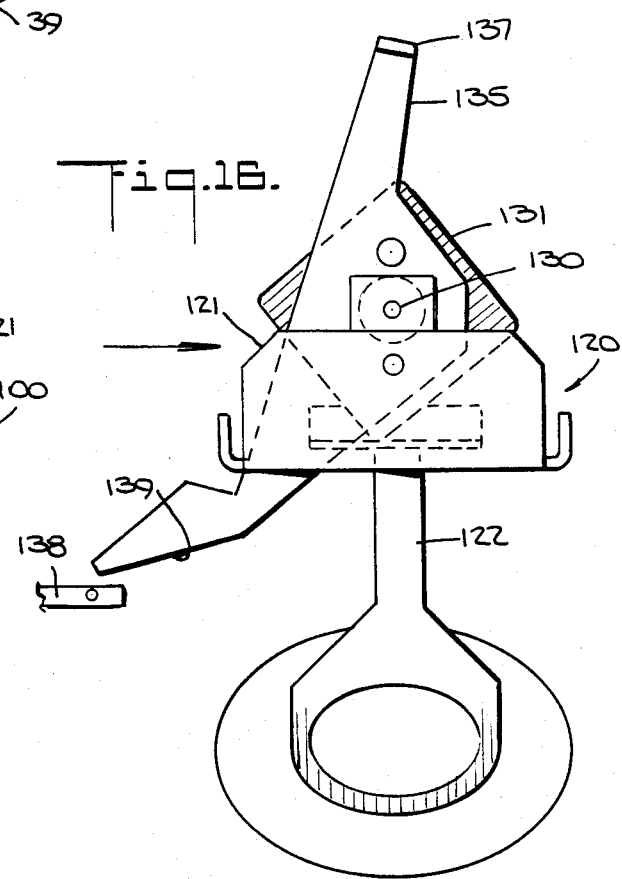
FIG. 16 is a side elevation view, looking from the rear of the machine, of the egg carriage assembly in the closed or egg engaging position.

Once the egg arrives above the appropriate packer 150 (FIG. 1) a separate actuating means engages the upper T-section 137 of extension bar 135 causing the same to move in a counterclockwise direction (looking from the rear of the machine) thereby releasing the egg from the carriage assembly 100. In this respect, a solenoid activated plunger is moved into the path of the carriage assembly so that the lower end thereof engages the top portion of T-section 137. Thus, counterclockwise rotation of bar 135 from the position depicted in FIG. 16 to that depicted in FIG. 15 causes the prongs 122 to pivot outwardly with respect to one another due to the force exerted by the spring member which urges prongs 122 toward the open or release position.

Thus there has been described an effective system for transferring eggs toward and away from a weighing station at which the size characteristics of each egg is measured. In particular, the system provides for the side-by-side movement of multiple rows of eggs, six in the described embodiment, through a weighing station with each egg being advanced individually but in side-by-side relationship with the characteristics of each egg being measured and stored in a memory system in accordance with which information the eggs are later deposited for packing into designated cartons.

Although the above description is directed to a preferred embodiment of the invention, it is noted that other variations and modifications will be apparent to those skilled in the art, and, therefore, may be made without departing from the spirit and scope of the present disclosure.

What is claimed is:

1. An egg transfer system adapted to move an egg through a weighing station which comprises:
   a first egg holding station onto which the egg is fed;
   an egg weighing station disposed in line with and downstream of said first egg holding station;
   a second egg holding station disposed in line with and downstream of said weighing station;
   advancing means rotatably movable with respect to each of said stations adapted to engage an egg from the underside during the rotary movement thereof and advance the egg from one station to another; and
   lifting means adapted to engage an egg from the underside thereof and lift the egg from said second holding station, said lifting means being rotationally and reciprocally movable with respect to said second egg holding station, said rotational movement thereof being about an axis generally parallel to the line formed by said stations to facilitate the engagement and lifting of the egg by said lifting means during the upward rotational movement thereof, said reciprocal movement being generally along the line formed by said stations and sufficient to reciprocate said lifting means away from said second egg holding station as said advancing means is being moved thereto.

2. The egg transfer system of claim 1 wherein said first egg holding station comprises a narrow elongated member including an egg receiving section therein and wherein said lifting means includes a pair of egg engaging surfaces sufficiently spaced from one another a distance at least equal to the width of said narrow elongated member and weighing station to permit said surfaces to move upwardly thereover and engage an egg disposed thereon from the underside thereof.

3. The egg transfer system of claim 1 wherein said lifting means comprises:
   an elongated lifting member having an egg receiving section therein adapted to engage an egg at said second holding station from the underside thereof and lift the egg therefrom;
   a crank member coupled to said lifting member;
   rotary drive means coupled to said crank member for rotationally driving said lifting member with respect to said second egg holding station, the drive axis of said crank member being offset with respect to said second egg holding station so that said lifting member is rotationally movable into engagement with said second egg holding station from the underside thereof to effect lifting of an egg disposed at said second egg holding station upwardly and away therefrom; and
   reciprocating drive means coupled to said lifting member for reciprocally moving said lifting member toward and away from said second egg holding station.

4. The egg transfer system of claim 3 which further includes a carriage assembly adapted to be conveyed in a generally linear direction through a line generally tangent to the path of said rotary driven lifting member, said carriage assembly including a pair of oppositely disposed egg engaging members being pivotally movable with respect to one another so as to engage and close upon the egg being transferred from said lifting member, said engaging members having a downwardly depending curved portion contoured to conform to the shape of the egg to facilitate a holding engagement therewith, and means coupled to said egg engaging members adapted to pivotally close said members upon one another as said carriage assembly passes said lifting member thereby transferring the egg to said carriage assembly.

5. The egg transfer system of claim 4 wherein said second egg holding station and said elongated lifting member each comprise a narrow elongated member including a pair of egg receiving sections therein, and wherein said carriage assembly includes two pairs of egg engaging members to facilitate the simultaneous transfer of two eggs from said lifting member to said carriage assembly.

6. An egg transfer system for advancing an egg from a candling station to a weighing station which comprises:
  a narrow elongated egg holding means disposed adjacent the candling station and on which the egg is supported, said egg holding means having an inclined surface to facilitate a gravity feed of the eggs from the candling station onto said holding means;
  a weighing station disposed adjacent said egg holding means and including a weighing means thereat adapted to weigh an egg disposed thereon;
  transfer means rotatably movable with respect to said egg holding means and weighing station adapted to engage an egg from the underside thereof and transfer the egg from one position to another, said transfer means including a pair of egg engaging surfaces sufficiently spaced from one another a distance at least equal to the width of said narrow elongated holding means and weighing means to permit said egg engaging surfaces to move upwardly thereover and engage an egg disposed thereon from the underside thereof; and
  drive means coupled to said transfer means for driving said egg engaging surfaces with respect to said holding means and weighing station in a generally elliptical path so as to enable said egg engaging surfaces to advance an engaged egg therefrom, said transfer means further including a generally horizontal upper section and a downwardly depending inclined section connected thereto, said downwardly inclined section being coupled at the lower end thereof to said drive means, said drive means comprising a drive motor, a member rotatably driven by said drive motor and being pivotally connected to said lower end of said downwardly inclined section, a second crank member rotatably driven by said drive motor and a connecting linkage pivotally coupled at one end thereof to said second crank member and at the other end thereof being pivotally coupled to said inclined section at a point above that of said first crank member to drive said horizontal upper section of said transfer means in a generally elliptical path with the motion between said holding means and weighing station being along the major axis of said elliptical path.

7. The egg transfer system of claim 6 wherein said transfer means includes a generally horizontal upper section having at least two egg receiving sections in said spaced surfaces.

8. The egg transfer system of claim 6 which further includes a second narrow elongated egg holding means disposed downstream of said weighing station and lifting means adapted to engage an egg from the underside thereof and lift the egg from said second holding means, said lifting means being rotationally and reciprocally movable with respect to said second egg holding means, said rotational movement thereof being about an axis generally parallel to that of said second elongated egg holding means to facilitate the engagement and lifting of the egg by said lifting means during the upward rotational movement thereof, said reciprocal movement being generally in line with said second elongated holding means and sufficient to reciprocate said lifting means away from said second egg holding means as said transfer means is being moved thereto.

9. The egg transfer system of claim 8 which further includes a carriage assembly adapted to be conveyed in a generally linear direction through a line generally tangent to the path of said rotary driven lifting means, said carriage assembly including a pair of oppositely disposed egg engaging members being pivotally movable with respect to one another so as to engage and close upon the egg being transferred from said lifting means, said engaging members having a downwardly depending curved portion contoured to conform to the shape of the egg to facilitate a holding engagement therewith, and means coupled to said egg engaging members adapted to pivotally close said members upon one another as said carriage assembly passes said lifting means thereby transferring the egg to said carriage assembly.

10. A method of transferring eggs through a weighing station at which the eggs are graded according to their respective size comprising the steps of:
  transferring the eggs away from a candling area;
  advancing the eggs from the candling area to a weighing station by reciprocally moving said eggs in a vertical and a horizontal direction;
  weighing the eggs at the weighting station;
  advancing the eggs from the weighing station to a holding station by reciprocally moving said eggs in a vertical and a horizontal direction;
  lifting the eggs from the holding station from the underside thereof and rotating the eggs upwardly with respect thereto about an axis generally parallel to a line formed by said candling, weighing and holding stations;
  routing an egg engaging carriage assembly with the egg engaging members facing downwardly in a line generally tangent to the path of the upwardly rotating eggs and approximately perpendicular to the line formed by said candling, weighing and holding stations;
  engaging the eggs being upwardly rotated with the downwardly depending egg engaging members of the carriage assembly; and
  closing the egg engaging members on the upwardly rotated eggs whereby said eggs are conveyed by said egg engaging members along a line substantially perpendicular to the line formed by said candling, weighing and holding stations.

11. The method of claim 10 wherein said step of lifting the eggs from the holding station from the underside thereof and rotating the eggs upwardly with respect thereto further includes the step of reciprocally moving the lifted eggs away from the holding station.

12. The method of claim 11 wherein said step of rotating the eggs upwardly is accomplished simultaneously with said step of reciprocally moving the lifted eggs away from the holding station.

13. The method of claim 10 wherein said step of routing an egg engaging carriage assembly with the egg engaging members facing downwardly in a line generally tangent to the path of the upwardly rotating eggs comprises moving the carriage assembly along a generally horizontal path tangent to the uppermost portion of the path of the upwardly rotating eggs.

14. The method of claim 10 wherein said step of transferring eggs away from the candling area includes the step of rolling the eggs from the candling area down an inclined surface.

15. The method of claim 10 which further includes the step of transporting the engaged eggs in the carriage assembly to a packing station.

16. The method of claim 15 which further includes the step of storing the weight of each of the respective eggs weighed at the weighing station for the purpose of utilizing the stored information to separate the eggs in accordance with their respective weights.

17. An egg lifting system adapted to move an egg upwardly and in a direction away from a station which comprises:
   an egg holding means disposed at the station;
   a lifting member adapted to engage an egg disposed on said holding means from the underside thereof and lift the egg upwardly therefrom;
   a crank member coupled to said lifting member;
   rotary drive means coupled to said crank member for rotationally driving said lifting member with respect to said egg holding means, the drive axis of said crank member being offset with respect to said holding means so that said lifting member is rotationally movable into engagement with said egg holding means from the underside thereof to effect lifting of an egg disposed on said holding means upwardly and away therefrom; and
   reciprocating drive means coupled to said lifting member for reciprocally moving said lifting member toward and away from said egg holding means.

18. The egg lifting system of claim 17 wherein said rotary drive means includes a rotational drive shaft having said crank member mounted on one end thereof and a drive means operatively coupled to said drive shaft.

19. The egg lifting system of claim 18 wherein said rotational drive shaft is mounted at the other end thereof to said reciprocating means.

20. The egg lifting system of claim 17 which further includes a carriage assembly adapted to be conveyed in a generally linear direction through a line generally tangent to the path of said rotary driven lifting member, said carriage assembly including a pair of oppositely disposed egg engaging members being pivotally movable with respect to one another so as to engage and close upon the egg being transferred from said lifting member, said engaging members having a downwardly depending curved portion contoured to conform to the shape of the egg to facilitate a holding engagement therewith, and means coupled to said egg engaging members adapted to pivotally close said members upon one another as said carriage assembly passes said lifting member thereby transferring the egg to said carriage assembly.

21. The egg lifting system of claim 17 which further includes an egg weighing station disposed upstream of said egg holding means, and advancing means rotatably movable with respect to said egg holding means and weighing station adapted to engage an egg from the underside during the rotary movement thereof and advance the egg from said weighing station to said egg holding means.

22. The egg lifting system of claim 19 wherein said reciprocating means comprises:
   a drive member;
   cam means coupled to said drive member;
   a connecting arm driven by said cam means;
   a rotating arm pivotally connected at one end thereof to said connecting arm and being rotational about an axis disposed at an angle of 90° with respect to that of said drive member; and
   an oscillating drive shaft connected to the other end of said rotating arm and operatively connected to said rotational drive shaft for reciprocally moving said drive shaft with respect to said egg holding means.

23. The egg lifting system of claim 21 wherein said advancing means comprises:
   a drive motor;
   a generally horizontal upper section and a downwardly depending inclined section connected thereto, said downwardly inclined section being coupled at the lower end thereof to said drive motor;
   a first crank member rotatably driven by said drive motor and being pivotally connected to said lower end of said downwardly inclined section;
   a second crank member rotatably driven by said drive motor; and
   a connecting linkage pivotally connected at one end thereof to said second crank member and at the other end thereof being pivotally connected to said inclined section at a point above that of said first crank member to drive said horizontal upper section of said advancing means in a generally elliptical path with the motion between said weighing station and said egg holding means being along the major axis of said elliptical path.

24. The combination of an egg lifting and egg carrying system which comprises:
   an egg holding means having a narrow width and a longitudinal dimension in a direction of travel of the egg;
   transfer means rotatably movable with respect to said egg holding means adapted to engage an egg from the underside thereof and transfer the egg to said egg holding means, said transfer means having a pair of egg engaging surfaces sufficiently spaced from one another a distance at least equal to the width of said egg holding means to permit said surfaces to move downwardly thereover to place an egg on said egg holding means;
   a lifting member having a pair of egg engaging surfaces sufficiently spaced from one another a distance at least equal to the width of said egg holding means to permit said surfaces to move upwardly thereover and engage an egg disposed thereon from the underside thereof and lift the egg upwardly therefrom once said transfer means has placed an egg on said egg holding means;
   rotary drive means including a drive member coupled to said lifting member for rotationally driving said member about an axis generally parallel to the longitudinal dimension of said egg holding means;
   a carriage assembly adapted to be conveyed in a generally linear direction through a line generally tangent to the path of said rotary driven lifting member, said carriage assembly including a pair of oppositely disposed egg engaging members being pivotally movable with respect to one another so as to engage and close upon the egg being transferred from said lifting member, said engaging members having a downwardly depending curved portion contoured to conform to the shape of the egg to facilitate a holding engagement therewith; and
   means coupled to said egg engaging members adapted to pivotally close said members upon one another as said carriage assembly passes said lifting member thereby transferring the egg to said carriage assembly, whereby said egg is carried by said carriage assembly along a line substantially perpendicular to said longitudinal dimension of said egg holding means.

25. The combination of claim 24 wherein said egg holding means comprises a narrow elongated member including a pair of egg receiving sections therein, and wherein said carriage assembly includes two pairs of egg engaging members to facilitate the simultaneous transfer of two eggs from said lifting member to said carriage assembly.

26. The combination of claim 24 which further includes a crank member and wherein said rotary drive means comprises said drive member coupled to said crank member for rotationally driving said lifting member with respect to said egg holding means, the drive axis of said crank member being offset with respect to said holding means so that said lifting member is rotationally movable into engagement with said egg holding means from the underside thereof to effect lifting of an egg disposed on said holding means upwardly and away therefrom.

27. The combination of claim 25 which further includes a reciprocating drive means coupled to said lifting member for reciprocally moving said lifting member toward and away from said egg holding means which comprises:

cam means coupled to said drive member;
a connecting arm driven by said cam means;
a rotating arm pivotally connected at one end thereof to said connecting arm and being rotational about an axis disposed at an angle of 90° with respect to that of said drive member; and
an oscillating drive shaft connected to the other end of said rotating arm and operatively connected to said rotational drive shaft for reciprocally moving said drive shaft with respect to said egg holding means.

28. The combination of claim 26 wherein said rotary drive means includes a rotational drive shaft having said crank member mounted on one end thereof and a drive means coupled to said drive shaft.

29. The combination of claim 28 which further includes a reciprocating drive means coupled to said lifting member for reciprocally moving said lifting member toward and away from said egg holding means and wherein said rotational driveshaft is mounted at the other end thereof to said reciprocating means.

30. An egg transfer system for advancing an egg from a candling station to a weighing station which comprises:

a narrow elongated egg holding means disposed adjacent the candling station and on which the egg is supported, said egg holding means having an inclined surface to facilitate a gravity feed of the eggs from the candling station onto said holding means;
a weighing station disposed adjacent said egg holding means and including a weighing means thereat adapted to weigh an egg disposed thereon;
transfer means rotatably movable with respect to said egg holding means and weighing station adapted to engage an egg from the underside thereof and transfer the egg from one position to another, said transfer means including a pair of egg engaging surfaces sufficiently spaced from one another a distance at least equal to the width of said narrow elongated holding means and weighing means to permit said egg engaging surfaces to move upwardly thereover and engage an egg disposed thereon from the underside thereof;
drive means coupled to said transfer means for driving said egg engaging surfaces with respect to said holding means and weighing station in a generally elliptical path so as to enable said egg engaging surfaces to advance an engaged egg therefrom; and
a second narrow elongated egg holding means disposed downstream of said weighing station and lifting means adapted to engage an egg from the underside thereof and lift the egg from said second holding means, said lifting means being rotationally and reciprocally movable with respect to said second egg holding means, said rotational movement thereof being about an axis generally parallel to that of said second elongated egg holding means to facilitate the engagement and lifting of the egg by said lifting means during the upward rotational movement thereof, said reciprocal movement being generally in line with said second elongated holding means and sufficient to reciprocate said lifting means away from said second egg holding means as said transfer means is being moved thereto.

31. The egg transfer system of claim 30 which further includes a carriage assembly adapted to be conveyed in a generally linear direction through a line generally tangent to the path of said rotary driven lifting means, said carriage assembly including a pair of oppositely disposed egg engaging members being pivotally movable with respect to one another so as to engage and close upon the egg being transferred from said lifting means, said engaging members having a downwardly depending curved portion contoured to conform to the shape of the egg to facilitate a holding engagement therewith, and means coupled to said egg engaging members adapted to pivotally close said members upon one another as said carriage assembly passes said lifting means thereby transferring the egg to said carriage assembly.

32. The egg transfer system of claim 30 wherein said transfer means includes a generally horizontal upper section having at least two egg receiving sections in said spaced surfaces.

33. The egg transfer system of claim 30 wherein said transfer means includes a generally horizontal upper section and a downwardly depending inclined section connected thereto, said downwardly inclined section being coupled at the lower end thereof to said drive means.

34. The egg transfer system of claim 33 wherein said drive means comprises:

a drive motor;
a first crank member rotatably driven by said drive motor and being pivotally connected to said lower end of said downwardly inclined section;
a second crank member rotatably driven by said drive motor; and
a connecting linkage pivotally coupled at one end thereof to said second crank member and at the other end thereof being pivotally coupled to said inclined section at a point above that of said first crank member to drive said horizontal upper section of said transfer means in a generally elliptical path with the motion between said holding means and weighing station being along the major axis of said elliptical path.

35. A method of transferring eggs through a weighing station at which the eggs are graded according to their respective size comprising the steps of:
   transferring the eggs away from a candling area;
   advancing the eggs from the candling area to a weighing station;
   weighing the eggs at the weighing station;
   advancing the eggs from the weighing station to a holding station;
   lifting the eggs from the holding station from the underside thereof and rotating the eggs upwardly with respect thereto;
   reciprocally moving the lifted eggs away from the holding station;
   routing an egg engaging carriage assembly with the egg engaging members facing downwardly in a line generally tangent to the path of the upwardly rotating eggs;
   engaging the eggs being upwardly rotated with the downwardly depending egg engaging members of the carriage assembly; and
   closing the egg engaging members on the upwardly rotated eggs.

36. The method of claim 35 wherein said step of rotating the eggs upwardly is accomplished simultaneously with said step of reciprocally moving the lifted eggs away from the holding station.

37. The method of claim 35 wherein said step of routing an egg engaging carriage assembly with the egg engaging members facing downwardly in a line generally tangent to the path of the upwardly rotating eggs comprises moving the carriage assembly along a generally horizontal path tangent to the uppermost portion of the path of the upwardly rotating eggs.

38. The method of claim 35 wherein said step of transferring eggs away from the candling area includes the step of rolling the eggs from the candling area down an inclined surface.

39. The method of claim 35 which further includes the step of transporting the engaged eggs in the carriage assembly to a packing station.

40. The method of claim 39 which further includes the step of storing the weight of each of the respective eggs weighed at the weighing station for the purpose of utilizing the stored information to separate the eggs in accordance with their respective weights.

41. The combination of an egg lifting and egg carrying system which comprises:
   an egg holding means;
   a lifting member adapted to engage an egg on said holding means from the underside thereof and lift the egg upwardly therefrom;
   rotary drive means coupled to said lifting member for rotationally driving said member with respect to said egg holding means;
   a carriage assembly adapted to be conveyed in a generally linear direction through a line generally tangent to the path of said rotary driven lifting member, said carriage assembly including a pair of oppositely disposed egg engaging members being pivotally movable with respect to one another so as to engage and close upon the egg being transferred from said lifting member, said engaging members having a downwardly depending curved portion contoured to conform to the shape of the egg to facilitate a holding engagement therewith;
   means coupled to said egg engaging members adapted to pivotally close said members upon one another as said carriage assembly passes said lifting member thereby transferring the egg to said carriage assembly; and
   reciprocating drive means coupled to said lifting member for reciprocally moving said lifting member toward and away from said egg holding means comprising cam means coupled to a drive member, a connecting arm driven by said cam means, a rotating arm pivotally connected at one end thereof to said connecting arm and being rotational about an axis disposed at an angle of 90° with respect to that of said drive member and an oscillating drive shaft connected to the other end of said rotating arm and operatively connected to said rotational drive shaft for reciprocally moving said drive shaft with respect to said egg holding means.

42. The combination of claim 41 which further includes a crank member and wherein said rotary drive means comprises:
   said drive member coupled to said crank member for rotationally driving said lifting member with respect to said egg holding means, the drive axis of said crank member being offset with respect to said holding means so that said lifting member is rotationally movable into engagement with said egg holding means from the underside thereof to effect lifting of an egg disposed on said holding means upwardly and away therefrom.

43. The combination of claim 42 wherein said rotary drive means includes a rotational drive shaft having said crank member mounted on one end thereof and a drive means coupled to said drive shaft.

44. The combination of claim 43 wherein said rotational drive shaft is mounted at the other end thereof to said reciprocating means.

45. The combination of claim 41 wherein said egg holding means comprises a narrow elongated member including a pair of egg receiving sections therein, and wherein said carriage assembly includes two pairs of egg engaging members to facilitate the simultaneous transfer of two eggs from said lifting member to said carriage assembly.

* * * * *